May 14, 1957 J. DICKSON 2,791,989
INTERNAL-COMBUSTION ENGINE
Filed Sept. 29, 1954 2 Sheets-Sheet 1

INVENTOR
John Dickson
BY
J. C. Thorpe
ATTORNEY

May 14, 1957  J. DICKSON  2,791,989
INTERNAL-COMBUSTION ENGINE
Filed Sept. 29, 1954  2 Sheets-Sheet 2

INVENTOR
John Dickson
BY
J. C. Thorpe
ATTORNEY

United States Patent Office 2,791,989
Patented May 14, 1957

2,791,989
INTERNAL-COMBUSTION ENGINE

John Dickson, Huntington Woods, Mich., assignor to General Motors Corporation, Detroit, Mich., a corporation of Delaware Application September 29, 1954, Serial No. 459,142

10 Claims. (Cl. 123—32)

This invention relates to internal-combustion engines and in particular to the cylinders and cylinder heads thereof.

Various surfaces within internal-combustion engine cylinders are subjected to rather severe thermal expansive and contractive conditions which are imposed by the heats of compression and combustion which occur within the cylinder and by the flow of relatively cool gaseous charge into and the flow of relatively hot exhaust gases from the engine cylinder. The severity of these thermal expansive and contractive conditions is particularly noticeable in those applications where the engine is subject to excessive fluctuations in load and speed; factors which result in sudden applications of relatively cool incoming air onto the over-heated surfaces within the cylinders. Such operation causes a high incidence of cracking of the affected surfaces such as, by way of example, in the fire deck surface of the cylinder head and the faces of the intake and exhaust valves, and also results in a high rate of cylinder head gasket failures due to the cyclic expansion and contraction of the cylinder head across the gasket face.

The principal object of this invention is to provide a means for preventing such cracking of the affected surfaces.

The portion of an engine cylinder or head forming the closed combustion chamber end of the cylinder is commonly called the fire deck and the surface thereof exposed to the combustion occurring within the engine cylinder is commonly called the fire deck surface. As indicated above, the fire deck surface and consequently the metal in that portion of the fire deck immediately adjacent thereto are subjected to rather severe thermal expansive and contractive conditions imposed as a result of the heats of compression and combustion and the flow of the gaseous charge and exhaust into and from the engine cylinder, respectively, with a resultant high incidence of head and gasket failures. The remainder of the fire deck portion is, of course, subjected only to substantially steady state thermal and heat transfer conditions. A further and more specific object of this invention is to provide a cylinder head having means for preventing such cylinder head cracking of the fire deck surface and failures of the cylinder head gaskets. This object is attained in accordance with the invention by providing the cylinder-facing surface of the cylinder head and particularly the fire deck surface thereof with grooves permitting and accommodating the relatively unrestricted plastic flow of the alternately heated and cooled fire deck surface and the immediately adjacent metal without setting up undue cyclic compressive expension and tensive contraction stresses within the cylinder head.

Other objects of the invention will become apparent from the following detailed description and the accompanying drawings illustrating several forms of the invention generally adapted to internal-combustion engines of the diesel type, in which.

Figure 1:
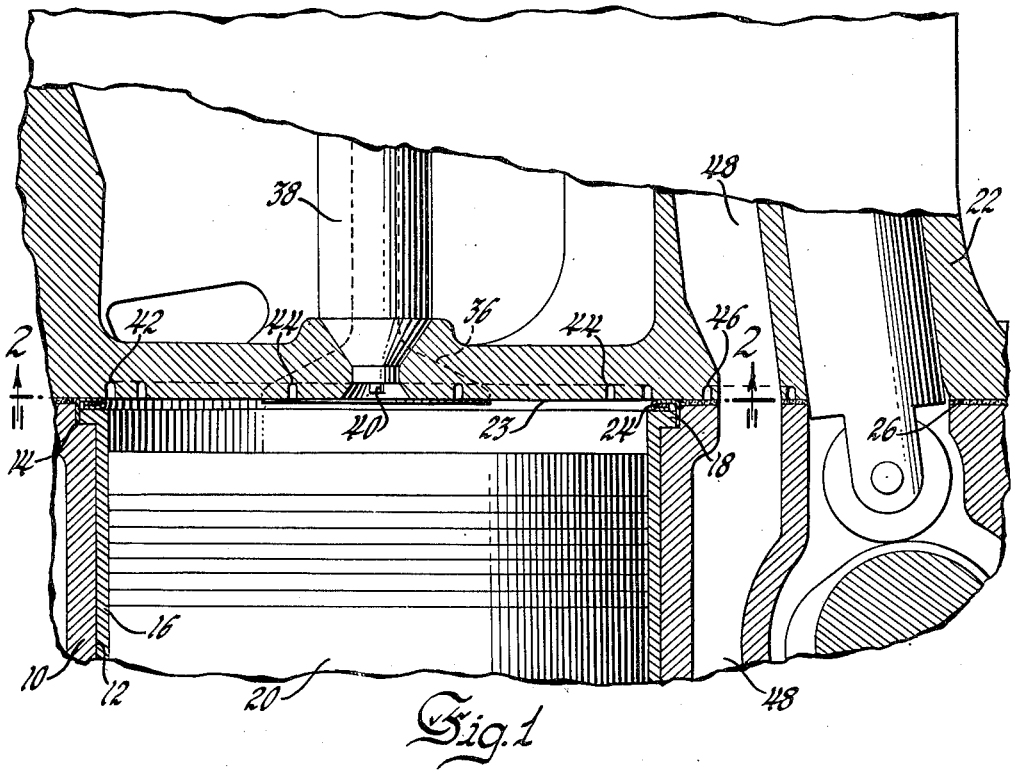
Figure 1 is a fragmentary view of an internal-combustion engine cylinder with parts thereof broken away and in section.

By way of illustration, the invention in the embodiment of Figure 1 is shown in a uniflow two-cycle engine in which the engine cylinder comprises an engine block 10 provided with a bore 12 having a shallow counterbore 14 at its upper end. A cylinder liner or sleeve 16 having a flange 18 at its upper end in abutment with the shoulder formed by the counterbore 14 is fitted within the cylinder bore 12, and a piston 20 is reciprocably mounted therein. A cylinder head 22 is suitably secured to the engine block and includes a fire deck portion 23 which serves to close the cylinder at its upper end. An annular high-compression gasket 24 is interposed between the counterbore 14, the flange portion 18 of the cylinder liner, and the fire deck surface of the cylinder head to provide an effective seal means therebetween. While the gasket 24 is shown as an individual circular gasket, it might be part of an overall head gasket. In the construction shown, additional gasket means, as indicated at 26, is interposed between the cylinder head and the engine block to effectively seal interconnecting passages or openings formed therein for cooling water, oil and injector and valve actuating mechanisms. Two diametrically aligned exhaust valve ports or openings 34 in the fire deck 23 of the cylinder head, as defined by the side walls of the cylinder and the high-compression gasket have poppet type valves 36 reciprocably mounted therein which are adapted to be seated thereon. A fuel injector or spark plug 38 is mounted in an opening 40 formed in the head concentrically with the cylinder combustion space.

Figure 2:
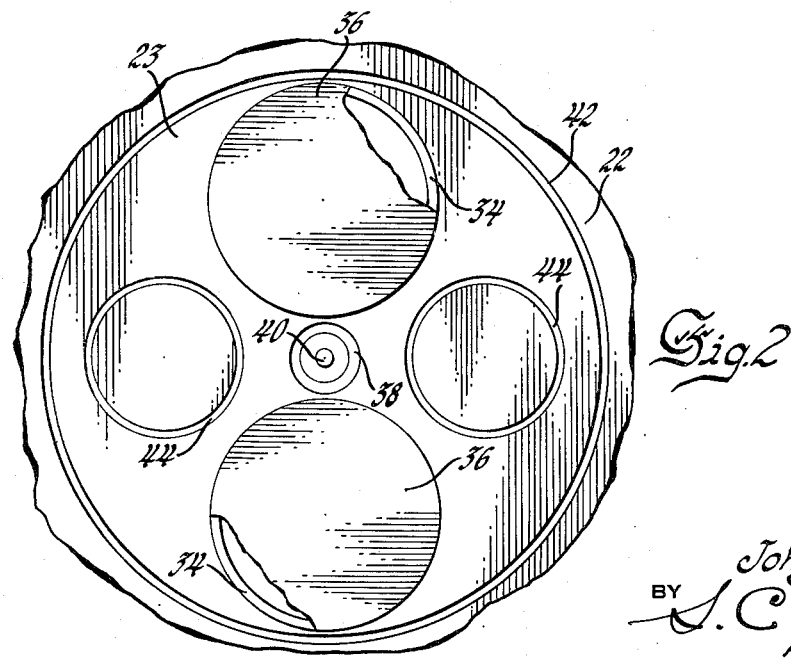
Figure 2 is a view taken substantially on the line 2—2 of Figure 1.

In accordance with the invention, the fire deck 23 is provided with a primary cylinder-facing groove 42 adjacent the inner surface or side walls of the cylinder liner 16 and the high-compression gasket 24. In the embodiment of Figures 1 and 2, a plurality of secondary cylinder-facing grooves are also formed radially inwardly of groove 42 and radially outwardly in flanking relationship to the diametrical plane common to the several adjacent ports, and similar grooves 46 are also provided in the cylinder head surface in concentric relation to the water cooling openings, as indicated at 48. As shown, the grooves 42, 44 and 46 are of shallow depth and radial width relative to the total thickness and the radial dimension, respectively, of the fire deck, but are of sufficient dimension to accommodate and permit the expansive and contractive plastic flow of the heated fire deck surface and of the immediately adjacent layer of metal without setting up undue cyclic thermal-expansion stresses within the cylinder head. Structural and heat transfer considerations have been found to make it preferable to limit the depth of such grooves substantially to the thickness of the portion of the fire deck subjected to such cyclic conditions and to have such grooves of a radial width slightly in excess of the maximum increment of radial expansion to be accommodated thereby. The use of such grooves also serves to reduce the surface conduction of the temperature extremes occurring along the lower face of the cylinder head. The groove 42 has the further particular advantage of alleviating the detrimental cyclic expansion and contraction of the cylinder head surface across the face of the high-compression gasket 24 while the grooves 44 serve to alleviate the extreme failure inducing cyclic expansive and contractive stresses which would otherwise be imparted in the relatively thin partitions between the valve openings and the injector nozzle. While Figure 1 shows the various grooves to be annular in form, the invention is not so limited and it is further contemplated that the various grooves 42, 44, and 46 may be used jointly and severally to alleviate cylinder head and cylinder gasket failures.

Figure 3:
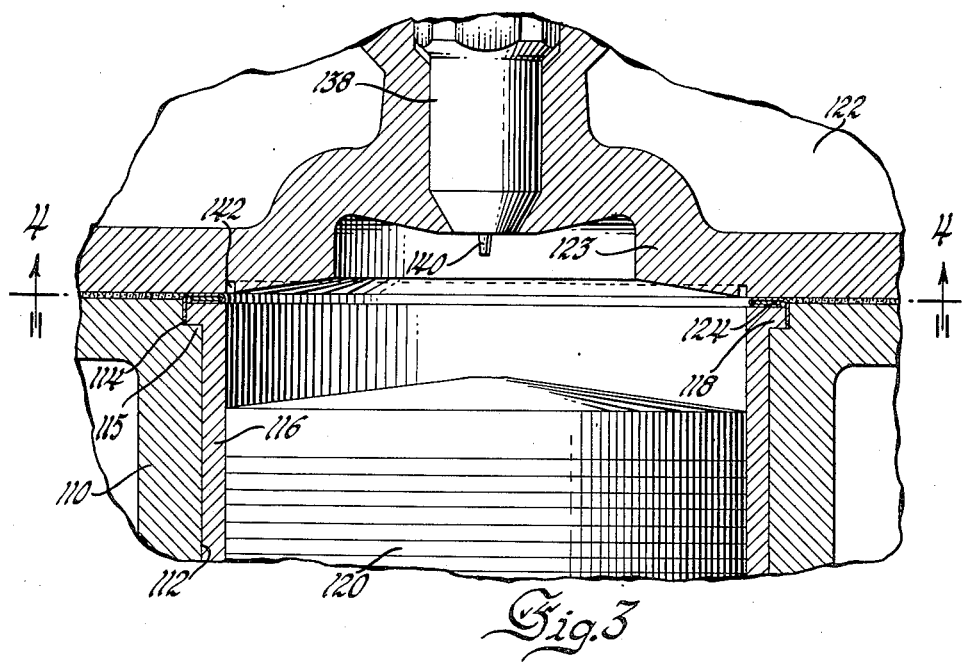
Figure 3 is a view similar to Figure 1 showing the application of the invention to a loop-scavenged two-cycle engine.
Figure 4:
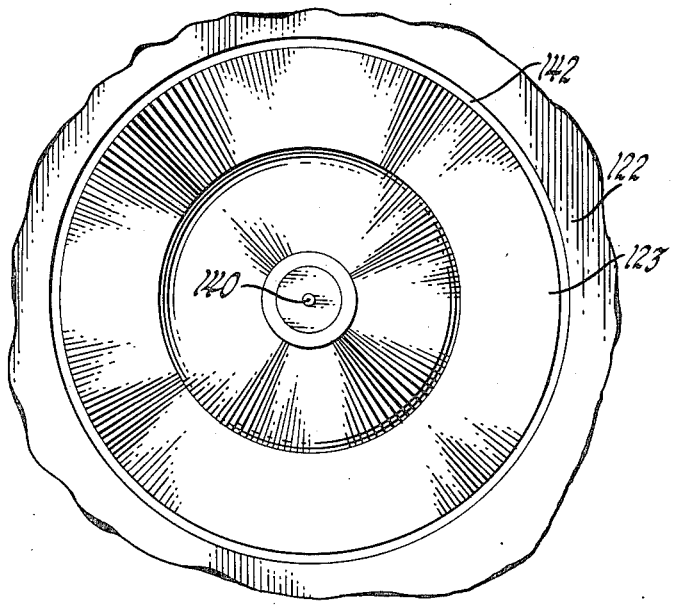
Figure 4 is a view taken substantially on the line 4—4 of Figure 3.

Figure 3 shows the embodiment of the invention in a two-cycle loop-scavenged engine in which a cylinder liner 116 is fitted into a bore 112 of a cylinder block 110. The cylinder liner 116 has a flanged portion 118 thereon at its upper end in abutment with a shoulder 115 formed by a shallow counterbore 114 at the upper end of the bore 112. A piston 120 is reciprocably mounted in the cylinder liner. A cylinder head 122 is suitably secured to the engine block and serves to close the cylinder bore at its upper end. The fire deck 123 of the cylinder head 122 is of stepped configuration in concentric relation about the nozzle 140 of the injector 138 and cooperates with the head of the piston 120 to form a semi-turbulent type combustion chamber therebetween. The fire deck 123 is provided with a single annular groove 142, corresponding to the annular groove 42 of the form of the invention shown in Figure 1, which is located adjacent an annular high-compression gasket 124 interposed between the cylinder head fire deck surface, the cylinder liner flange, and the counterbore of the cylinder block. Inasmuch as the stepped fire deck of such an engine cylinder head does not include valve ports presenting intermediate metal surfaces and portions of relatively narrow width facing the interior of said cylinders it is generally not necessary to provide secondary grooves such as utilized in the fire deck of the embodiment of the invention shown in Figures 1 and 2 since the cyclic expansive and contractive effects occurring in the metal of the fire deck immediately adjacent the combustion chamber are substantially radially balanced about the injector opening and the stepped configuration of this area tends to be self-accommodating to a portion of the cyclic stress imposed on this portion of the fire deck.

While the foregoing description and drawings have been confined to several embodiments of the invention for the purposes of illustration only, it will be apparent to those skilled in the art that various minor modifications may be made therein without departing from the spirit and scope of the invention as defined in the following claims.

I claim:

1. A cylinder for an internal-combustion engine having a cylinder head fire deck closing one end thereof, said fire deck having an annular groove adjacent the side walls of said cylinder and a plurality of angularly spaced grooves formed radially inwardly of said first-mentioned groove, each of said grooves being limited to a depth substantially accommodating cyclic expansion and contraction of that portion of said fire deck which is subject to cyclic thermal conditions due to the operating conditions occurring within said cylinder, the accumulative width of said grooves being sufficient to isolate such cyclic expansion and contraction of said fire deck portion from the remainder of the engine cylinder.

2. In an internal-combustion engine, a cylinder block having a cylinder bore therein, a cylinder head secured to said block and having a fire deck surface portion forming an end wall for said cylinder bore, said fire deck surface portion being subjected to cyclic thermal conditions due to the normal engine operating cycle occurring within said cylinder, the remainder of said cylinder head being subjected to substantially steady state heat transfer, a gasket interposed between said cylinder block and said cylinder head adjacent the side walls of said cylinder bore, and a narrow cylinder-facing annular groove formed in said fire deck surface portion immediately adjacent said gasket and the side walls of said cylinder bore, and said groove being of a depth and radial width to isolate said fire deck surface portion from expansion and contraction across said gasket.

3. In an internal-combustion engine, a cylinder block having a cylinder bore therein, a cylinder head secured to said block and having a fire deck surface portion forming an end wall for said cylinder bore, said fire deck surface portion being subjected to cyclic thermal conditions due to the normal engine operating cycle conditions occurring within said cylinder, the remainder of said cylinder head being subjected to substantially steady state heat transfer, said cylinder head having spaced ports opening on said fire deck surface portion, a gasket interposed between said cylinder block and said cylinder head adjacent the side walls of said cylinder bore, a narrow cylinder-facing groove formed in said fire deck surface portion immediately adjacent said gasket and the side walls of said cylinder, said groove being of a depth and width to permit the relatively unrestricted plastic expansion and contraction of said fire deck portion and limiting said fire deck surface portion from expansion and contraction across said gasket, and said fire deck having narrow cylinder-facing grooves formed therein in flanking relation to the portion of said head between adjacent ports, said last-mentioned grooves being of a depth and width to substantially prevent compressive and tensive stresses from being imposed on that portion of said fire deck surface portion intermediate adjacent ports.

4. In a thermal device, a member having a limited surface portion thereon adapted to be subjected to rapid and extreme cyclic changes of surface temperature thereby subjecting said portion to severe cyclic thermal expansive and contractive conditions relative to the other surface portions and to the interior of said member, said other surface portions and the interior of said member being maintained under substantially steady state thermal conditions, said limited surface portion having a narrow peripheral groove of a depth and width to accommodate the expansive and contractive plastic surface flow of said portion resulting from said rapid and extreme cyclic changes of surface temperature without imposing compressive expansion and tensive contraction stresses on said surface portion and to limit thermal surface conduction on said member from said limited surface portion.

5. In an internal combustion engine having a cylinder closed at one end and reciprocably mounting a piston to form an expansible combustion chamber therebetween, immediately adjacent to and including its surface defining the end of said combustion chamber said closed end of said cylinder having a layer of limited thickness subjected to cyclic thermal conditions due to the normal engine operating cycle occurring within said combustion chamber, the remainder of said closed end being subjected to substantially steady state heat transfer, and said closed end having a combustion-chamber-facing annular groove therein immediately adjacent the side walls of said cylinder adapted to accommodate the cyclic expansion and contraction of said layer and to isolate said expansion and contraction from the remainder of said cylinder, said groove being of a depth substantially equal to the thickness of said layer and of a width measured radially of said cylinder slightly in excess of the maximum increment of radial thermal expansion occurring in said layer due to said operating cycle.

6. In an engine having a cylinder closed at one end and reciprocably mounting a piston to form an expansible chamber therebetween, said closed end of said cylinder having a layer portion subjected to cyclic thermal conditions due to the normal engine operating cycle occurring within said chamber, said layer portion being of limited thickness relative to the total thickness of said closed end and being that portion immediately adjacent and including the surface of said closed end defining the end of said chamber, the remainder of said closed end being subjected to substantially steady state heat transfer, and said closed end having a chamber-facing annular groove therein immediately adjacent the side walls of said cylinder, said groove being adapted to permit the unrestrained plastic expansion and contraction of said portion under said cyclic thermal conditions and thereby to prevent the imposition of cyclic compressive and tensive stresses on said portion and said remainder, said groove being of a depth at least equal to the thickness of said portion and of a radial width in excess of the maximum increment of radial thermal expansion occurring in said layer portion due to said operating cycle.

7. In an engine utilizing a high temperature fluid and including a member having a limited surface thereon adapted to be alternately exposed to said high temperature fluid and to a relatively cool fluid thereby imposing extreme cyclic heat transfer conditions on the portion of said member immediately adjacent to an including said surface, the remainder of said member being subjected to substantially steady state heat transfer conditions during normal engine operating conditions, said member having a groove therein adapted to accommodate expansion and contraction of said portion, said groove being of a depth substantially equal to the thickness of said adjacent portion and of a width to accommodate the maximum expansion of said portion.

8. A cylinder head for an internal combustion engine having a fire deck surface thereon adapted to define one end of an expansible combustion chamber and having a plurality of angularly spaced valve ports opening through said fire deck surface, the layer of said cylinder head immediately adjacent to and including said fire deck surface being subjected to cyclic thermal conditions induced by the operating conditions occurring within said chamber and the remainder of said cylinder head being subjected to substantially steady state thermal conditions, said fire deck having a narrow annular groove opening on said chamber adjacent the side walls of said cylinder and secondary narrow annular grooves opening on said chamber, said secondary grooves being formed about axes radially spaced with respect to the axes of said adjacent valve ports, each of said grooves being limited to a depth substantially equal to the thickness of said layer and the accumulative widths of said grooves being sufficient to isolate the cyclic expansion and contraction of said layer radially from the remainder of said head thereby preventing the imposition of cyclic compressive and tensive stresses on said layer intermediate said valve ports.

9. In a cylinder head for an internal combustion engine having a fire deck surface thereon adapted to define one end of an expansible combustion chamber and having a plurality of spaced ports opening therethrough onto said fire deck surface, said ports defining web portions of reduced dimensions in said head, the layer of said cylinder head immediately adjacent to and including said fire deck surface being subjected to cyclic thermal conditions induced by the operating conditions occurring within said chamber and the remainder of said cylinder head being subjected to substantially steady state thermal conditions, said cylinder head having a plurality of grooves opening onto said chamber, said grooves being formed in flanking relationship with respect to a diametrical plane common to adjacent ports, and each of said grooves being of a depth and width sufficient to isolate cyclic expansion and contraction of said layer from the web portion intermediate the adjacent ports thereby preventing the imposition of cyclic compressive and tensive stresses on that portion of said layer intermediate adjacent ports.

10. In a thermal device, a member having a surface portion thereon adapted to be subjected to extreme temperature differentials thereby subjecting said surface portion and the immediately adjacent layer of said member to severe thermal expansive and contractive conditions relative to the other surface portions and the remainder of said member, said other surface portions and the remainder of said member being subjected to substantially steady state thermal conditions, said surface portion being defined by a narrow peripheral groove, said peripheral groove being of a depth and width to permit the relatively unrestricted expansive and contractive plastic flow of said surface portion and said adjacent layer and to limit surface conduction on said member from said surface portion.

References Cited in the file of this patent

UNITED STATES PATENTS

| 328,970 | Place | Oct. 27, 1885 |
| 788,057 | Morrison | Apr. 25, 1905 |
| 1,116,364 | Baker | Nov. 10, 1914 |

FOREIGN PATENTS

| 653,838 | France | Mar. 28, 1929 |